United States Patent [19]

Juengel et al.

[11] 4,181,958
[45] Jan. 1, 1980

[54] MULTIPLE PROBE GAGE SYSTEM

[75] Inventors: Richard O. Juengel, Romeo; Kenneth J. Cook, Troy, both of Mich.

[73] Assignee: The Valeron Corporation, Oak Park, Mich.

[21] Appl. No.: 898,831

[22] Filed: Apr. 21, 1978

[51] Int. Cl.² ............................................. G01B 7/12
[52] U.S. Cl. .................. 364/560; 33/174 L; 33/174 PC; 325/113; 364/474
[58] Field of Search ............... 364/550, 551, 556, 560, 364/468, 474; 33/174 L, 174 PC; 318/576, 578; 325/113; 340/147 B, 147 MT

[56] References Cited

U.S. PATENT DOCUMENTS

| | | | |
|---|---|---|---|
| 3,275,892 | 9/1966 | Schweitzer, Jr. | 325/113 |
| 3,582,921 | 6/1971 | Krieger | 325/113 |
| 3,801,970 | 4/1974 | Barnes | 325/113 |
| 3,805,036 | 4/1974 | Michaud et al. | 364/560 |
| 3,835,701 | 9/1974 | Murphy et al. | 364/556 |
| 3,878,984 | 4/1975 | Sotiropoulos et al. | 364/560 |
| 4,049,954 | 9/1977 | Da Costa Vieira et al. | 364/560 |
| 4,055,995 | 11/1977 | Armstrong et al. | 364/551 |
| 4,070,762 | 1/1978 | Siddall | 33/174 L |

Primary Examiner—Errol A. Krass
Attorney, Agent, or Firm—Krass & Young

[57] ABSTRACT

A multiple probe gage system wherein the analog output signal of a plurality of probes is successively sampled, digitized and stored. The stored information is then digitally processed by a microprocessor to produce a digital signal which is a function of the analog output signals of selected probes.

10 Claims, 5 Drawing Figures

MULTIPLE PROBE GAGE SYSTEM

BACKGROUND OF THE INVENTION

1. Field of the Invention.

This invention relates to a multiple probe gage system for use in measuring various dimensions of a workpiece, and more particularly to a system wherein digital processing techniques are utilized to process the analog output signals from a plurality of probes.

2. Description of the Prior Art.

In gaging operations involving complex shaped parts or when many different measurements of a workpiece are necessary, many electrical sensing probes are typically used. Since probe signal processing circuits constitute a large proportion of the cost of a gage system it is desirable to use one common probe signal processing circuit for all of the probes. This is typically accomplished by using transformers to add or subtract various probe signals to provide the desired measurements. This arrangement, however, results in a relatively inflexible system which must be custom designed for each application.

A more flexible system is disclosed by Michaud, et al in U.S. Pat. No. 3,805,036. Michaud teaches a system which utilizes a plurality of electrical sensing probes each of which provides variable level electrical analog gaging signals corresponding to the position of a point on a workpiece relative to a particular probe, an analog to digital convertor to convert these analog gaging signals to digital form, and a computation network which selectively computes the difference between the gaging signal values and either a stored maximum or a stored minimum value. This system, however, has limited computation capabilities since it operates by first storing the minimum and maximum values, then comparing the gaging signal of each sensing probe to the maximum and minimum values. Accordingly it is desirable to employ a system which is not limited to a specific computational mode.

SUMMARY OF THE INVENTION

This invention is directed to a multiple probe gage system which utilizes a digital processor and memory to perform a variety of arithmetic functions upon the digital signal resulting from each probe. In general the system operates by successively reading the analog gaging signal produced by each probe, converting each analog gaging signal to a digital signal, storing each digital signal within a memory and then after all of the signals are stored, using digital processing techniques to add, subtract, or perform any other arithmetic function upon the digital signals to obtain a desired result. The desired result may then be displayed on a column display in a conventional manner. This entire sequence of events occurs so rapidly as to appear to be a continuous operation, with the analog output signals of the probes being constantly scanned, digitized, and stored. Furthermore, since all arithmetic functions of the signals are performed at the digital level no additional error is introduced in the computational operation.

Other objects, advantages, and applications of the present invention are made apparent by the following detailed description of the preferred embodiment of the invention. The description makes reference to the accompanying drawings in which:

Figure 1:
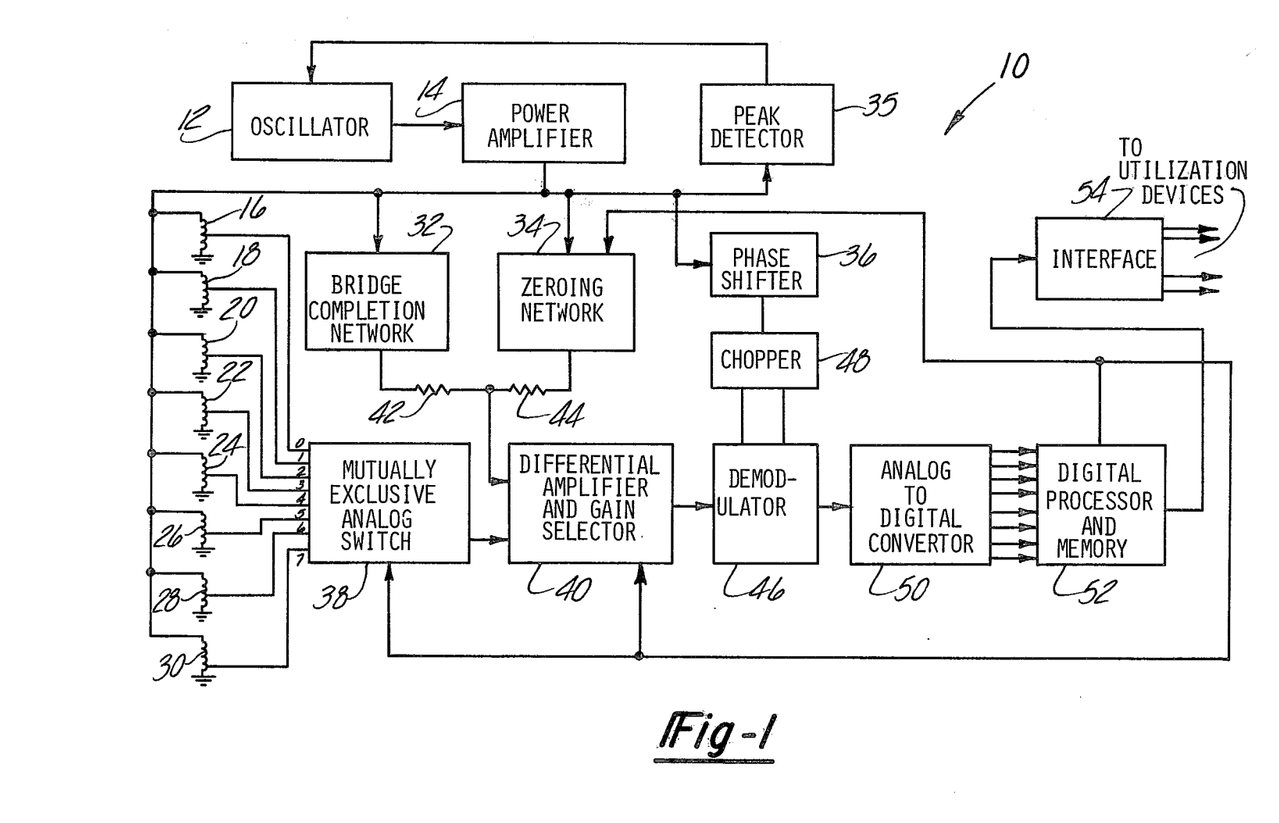
FIG. 1 is a block diagram illustrating a preferred embodiment of the invention.

Referring to the drawings FIG. 1 discloses a multiple probe gage system generally at 10. An oscillator 12 has its output connected to a power amplifier 14. The output of the power amplifier 14 is fed to the junction of the inputs of a set of variable displacement inductive probes, or transducers, 16, 18, 20, 22, 24, 26, 28 and 30, a bridge completion network 32, a zeroing network 34, a peak detector 35 and to a phase shifter 36. Each of the probes 16, 18, 20, 22, 24, 26, 28 and 30 is connected to a separate input of a mutually exclusive analog switch 38.

In the following description and claims the terms "probe" and "transducer" will be used interchangeably.

The analog switch 38 sequentially connects one of its inputs to its output, and this output signal is fed to the positive input of a differential amplifier and gain selector 40. The outputs of both the bridge completion network 32 and the zeroing network 34 are connected to the negative input of the differential amplifier and gain selector 40 through a resistor 42 and a resistor 44 respectively.

The output of the peak detector 35 is fed to an input of the oscillator 12. The phase shifter output is fed to the chopper 48, and the chopper is connected to a demodulator 46.

The demodulator 46 operates on the signal from the output of differential amplifier and gain selector 40, and feeds the demodulated signal to an analog to digital convertor 50. The digital output of the analog to digital convertor 50 is fed to a digital processor and memory 52. A control output of the digital processor and memory 52 successively triggers both the mutually exclusive switch 38 and the zeroing network 34. The outputs of digital processor and memory 52 are processed by an interface 54. The outputs of the interface 40 are used to perform various control and display functions.

In operation the oscillator 12 generates an excitation signal having a frequency of 5 kilohertz and this signal is amplified by the power amplifier 14 and then fed to the input of the inductive probes 16, 18, 20, 22, 24, 26, 28 and 30, to the bridge completion network 32, the zeroing network 34, the peak detector 35 and to the phase shifter 36. The analog switch 38 is sequentially triggered by the digital processor and memory 52 to thereby connect the output signal from one of the inductive probes 16, 18, 20, 22, 24, 26, 28 or 30 to its output. The differential amplifier and gain selector 40 amplifies the difference between the analog output signal of the selected probe and the sum of the outputs of the bridge completion network 32 and the zeroing network 34. The zeroing network is also sequentially triggered in conjunction with the analog switch 38 by digital processor and memory 52.

This amplified difference signal is demodulated by the demodulator 46 to produce an analog d.c. signal which varies in amplitude and polarity in accordance with the analog output signal of the selected probe.

The output signal from the power amplifier 14 is delayed by the phase shifter 36 and then fed to the chopper 48. The chopper 48 operates in conjunction with the demodulator 46 to provide synchronous detection of the output of the differential amplifier and gain selector 40.

The analog to digital convertor 50 converts the analog d.c. signal into an 8 bit digital number which can be read by the digital processor and memory 52. The digital processor and memory 52 holds a program for operating on the data obtained from each probe to thereby provide digital output signals to the interface 54. The interface 54 operates on the digital output signals to provide control signals which can drive a column display or perform other desired functions.

The preferred embodiment of the invention is described in greater detail in FIGS. 2a through 2d. The oscillator 12, shown in more detail in FIG. 2a, takes the form of an integrated circuit 102 in conjunction with a set of resistors 104, 106 and 108, a pair of capacitors 110 and 112, and a potentiometer 114 to generate an oscillating electrical signal.

Figure 2A:
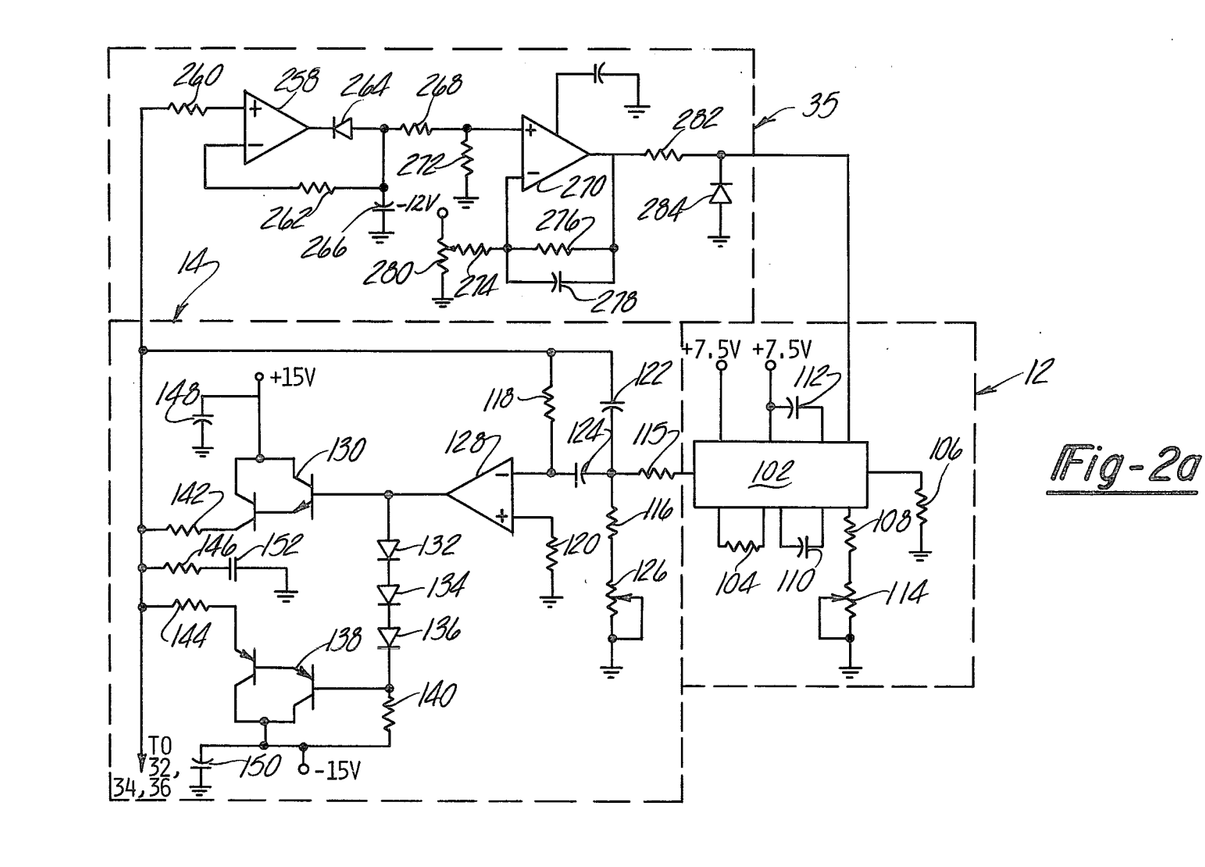
FIGS. 2a through 2d comprise a more detailed schematic diagram of the embodiment of FIG. 1.

The power amplifier 14 employs a filter network consisting of a set of resistors 115, 116, 118 and 120, a pair of capacitors 122 and 124 and a potentiometer 126. This network is connected to the input of an operational amplifier 128. The output of the amplifier 128 is connected to the input of a first Darlington transistor circuit 130 and is also connected through a set of diodes 132, 134 and 136 to a second Darlington transistor circuit. A set of resistors 140, 142, 144 and 146 and a set of capacitors 148, 150, and 152 complete the power amplifier circuit.

Figure 2B:
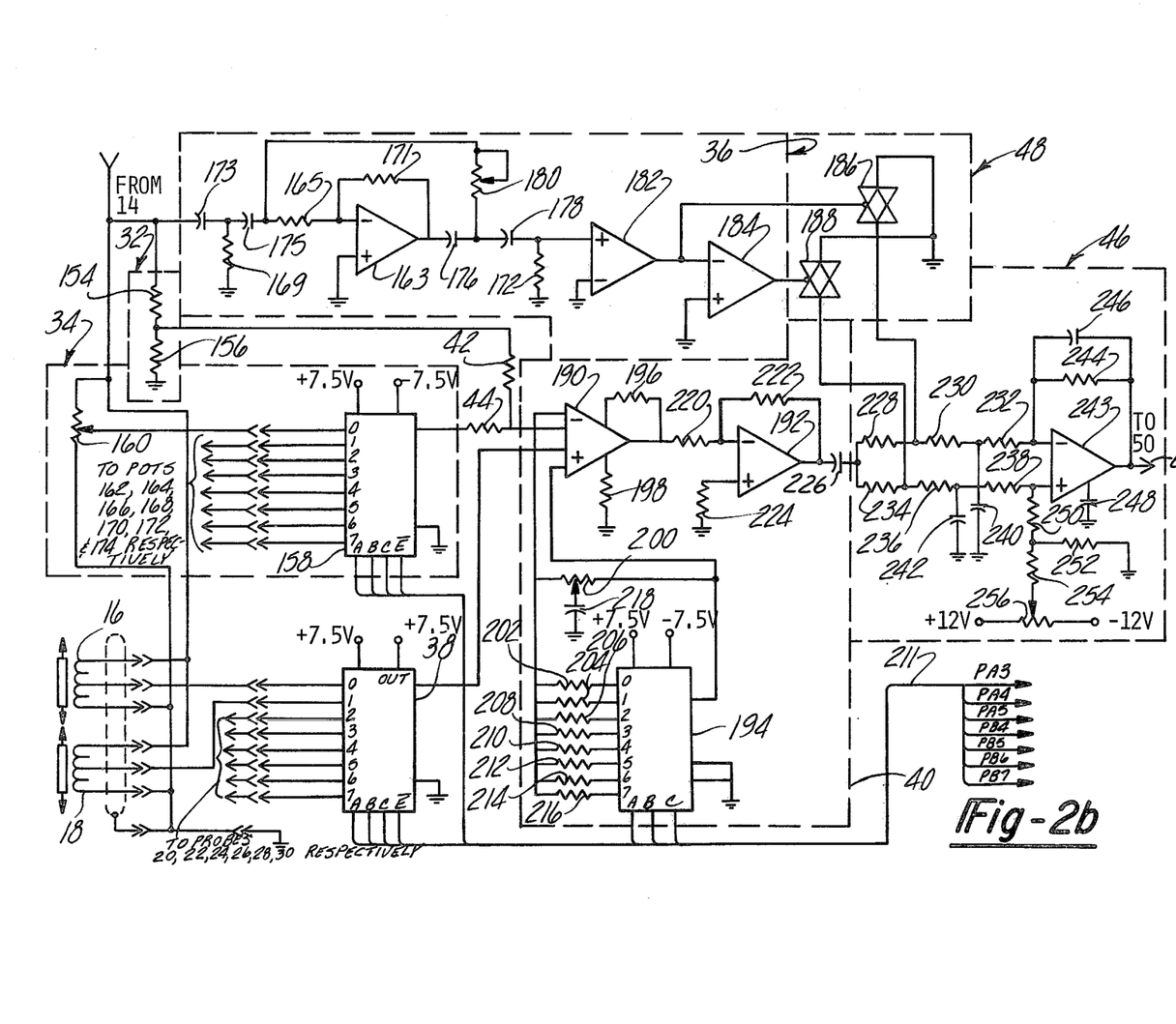

The bridge completion network 32 of FIG. 2b consists of a pair of resistors 154 and 156 connected in a voltage divider arrangement. The output of this bridge completion network is connected to one input of the differential amplifier and gain selector 40 through a resistor 42. The zeroing network 34 consists of a mutually exclusive analog switch 158 having each of its inputs connected to one of a set of potentiometers 160, 162, 164, 166, 168, 170, 172 and 174. The output of the analog switch 158 is connected through a resistor 44 to a junction of the resistor 42 and an input of the differential amplifier and gain selector 40.

The phase shifter 36 includes a differential amplifier 163 having its input and output connected to a set of resistors 165, 172, 169 and 171, a set of capacitors 173, 175, 176 and 178, and a potentiometer 180. The output of this circuit is in turn connected to the positive input of a differential amplifier 182. The negative input of the differential amplifier 182 is connected to ground. The output of the differential amplifier 182 is connected to the junction of the negative input of the differential amplifier 184 and one input of the chopper 48. The positive input of the amplifier 184 is connected to ground, and the output of the amplifier is connected to a second input of the chopper 48.

The chopper 48 consists of a pair of CMOS bidirectional switches 186 and 188. The output of each of the switches 186 and 188 is connected to a separate side of a balanced network within the demodulator 46.

The differential amplifier and gain selector 40 includes a pair of differential amplifiers 190 and 192, and a mutually exclusive, integrated circuit, analog switch 194. The amplifier 190 is connected to a pair of resistors 196 and 198, to a potentiometer 200, to the analog switch 194, and to a set of resistors 202, 204, 206, 208, 210, 212, 214, and 216. The other sides of each of these resistors are connected to separate inputs of the analog switch 194. A capacitor 218 is connected between ground and the center arm of the potentiometer 200. The differential amplifier 192 is connected to a set of resistors 220, 222, and 224 and to a capacitor 226 in a conventional feedback type of arrangement.

The demodulator 46 employs a balanced network comprised of a set of resistors 228, 230, 232, 234, 236 and 238 and a pair of capacitors 240 and 242 connected between the inputs of a differential amplifier 243 and the capacitor 226. A resistor 244 and a capacitor 246 are connected in parallel between the negative input of the amplifier 242 and its output. The positive input of the amplifier 242 is connected to the resistor 238 and to a voltage divider network consisting of a set of resistors 250, 252 and 254 and a potentiometer 256. The potentiometer 256 is connected between a positive and a negative external power supply.

The peak detector 35 of FIG. 2a employs a differential amplifier 258 having its positive input connected to the output of the power amplifier 14 through a resistor 260. The negative input of the amplifier 258 is connected through a resistor 262 to the junction of a diode 264, a capacitor 266 and a resistor 268. The other side of the diode 264 is connected to the output of the amplifier 258, and the other side of the capacitor 266 is connected to ground. The peak detector also employs a differential amplifier 270 having its positive input connected to the junction of the resistor 268 and a resistor 272. The negative input of the amplifier 270 is connected to the junction of a pair of resistors 274 and 276 and a capacitor 278. A potentiometer 280 is connected between an external negative power supply and ground with its center arm connected to the other side of a resistor 274. The output of the amplifier 270 is connected to the junction of the resistor 276, the capacitor 278 and a resistor 282. The other side of the resistor 282 is connected to the junction of the cathode of a diode 284 and an input of the integrated circuit 102. The anode of the diode 284 is connected to ground.

The analog digital convertor 50, the details of which are shown in FIG. 2a, employs an inverting amplifier 286 together with a pair of resistors 290 and 292 and a capacitor 294 to generate an oscillating electrical signal which is fed to the clock input of an analog digital power convertor integrated circuit 296. The digital outputs of the integrated circuit 296 are connected to an inverting amplifier 300 and to a tri-state buffer 302. The outputs of the tri-state buffer are connected to the digital processor and memory 52. A pair of resistors 304 and 306 are included in analog digital convertor 50, and are connected to the digital processor and memory 52.

In the drawings of FIG. 2, interconnections between certain terminals of the components and subsystems of the digital processor and memory 52 and the interface 54 are not separately illustrated, but rather connections are illustrated to and from various bus lines. The exact interconnections may be determined on the basis of the alphanumeric designators shown on the terminals of these components and subsystems in FIG. 2. For example, all terminals of units connected to the bus lines and designated A1 are actually interconnected with discrete wires.

Figure 2C:
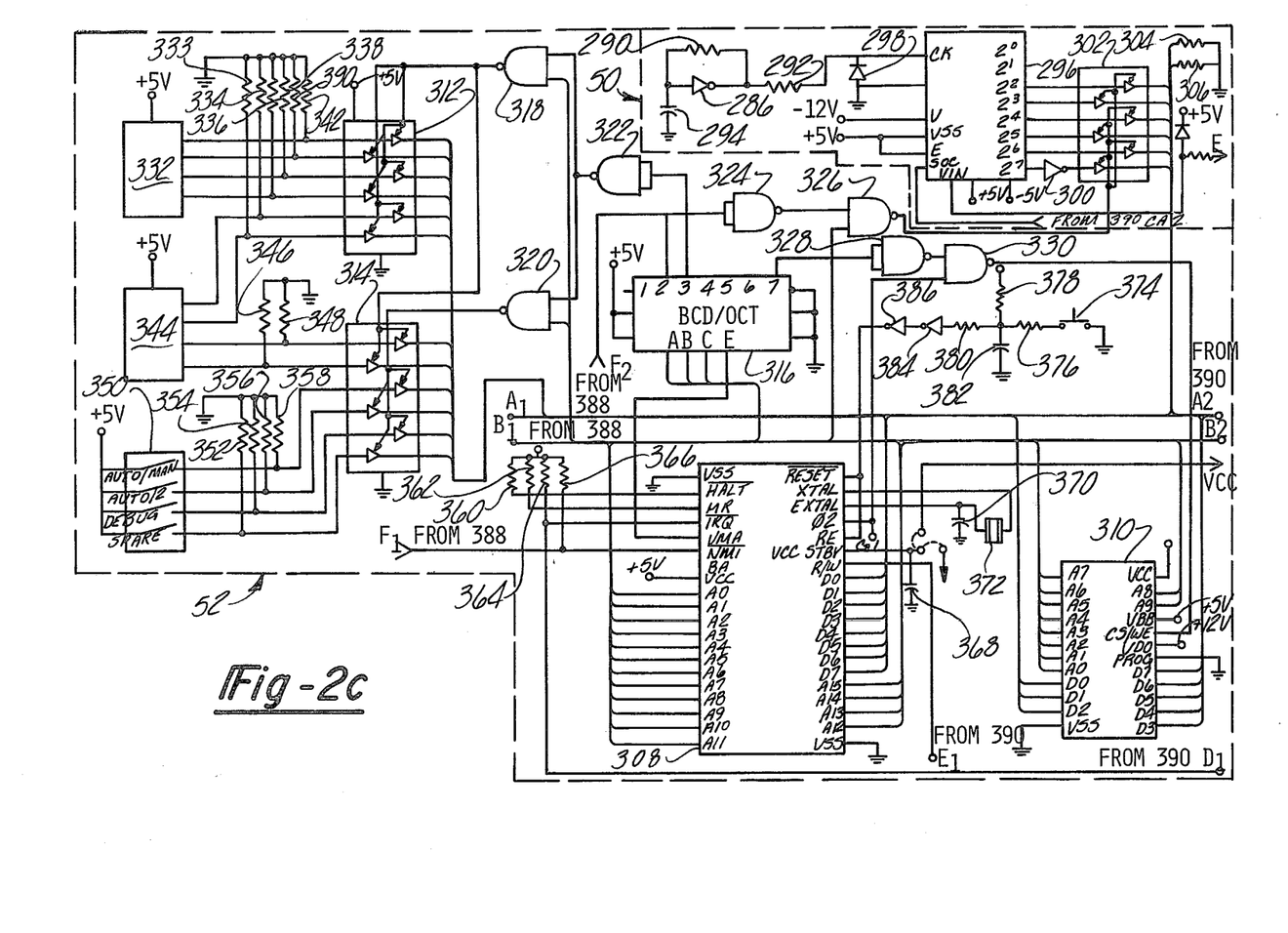

The digital processor and memory 52 includes a microprocessor and random access memory unit 308, an erasable programmable read only memory 310, a pair of tri-state buffers 312 and 314, a binary to octal convertor 316, and a set of NAND gates 318, 320, 322, 324, 326, 328 and 330.

A first binary coded decimal thumb wheel switch 332 is connected to the input of the tri-state buffer 312. A set of resistors 333, 334, 336, 338, 340 and 342 are connected between ground and the input of the tri-state buffer 312. A second binary coded decimal thumb wheel switch 344 has two of its inputs connected to the tri-state buffer 312, and its other two inputs connected to the input of the tri-state buffer 314. A pair of resistors 346 and 348 are each connected between ground and the junctions of the switch 344 and the buffer 314. A group of manually actuable switches 350 are connected to another set of inputs of the tri-state buffer 314. The inputs are connected to ground through resistors 352, 354, 356 and 358. The switches allow manual control of the system operating mode.

A binary to octal convertor 316 has one of its outputs connected to NAND gate 322. The output of the NAND gate 332 is connected to one input of each of the NAND gates 318 and 320. The output of the NAND gate 318 is connected to both of the tri-state buffers 312 and 314. The output of the NAND gate 320 is connected to the tri-state buffer 314. The binary to octal convertor 316 is also connected to the input of the NAND gate 324. The output of the NAND gate 324 is connected in turn to the input of the NAND gate 326. The output of the NAND gate 326 is connected to a tri-state buffer 302.

The input of the NAND gate 328 is connected to the binary to octal convertor 316 and the output of the gate 328 is connected to one input of the NAND gate 330. The other input of the NAND gate 330 is connected to the microprocessor unit 308. The output of the NAND gate 330 is connected to the erasable programmable read only memory 310.

A set of resistors 360, 362, 364 and 366 each have one side connected in common to an external positive power supply. The other side of each of the resistors is connected to a different input of the microprocessor unit 308. A capacitor 368 is connected between ground and the standby voltage input of the microprocessor unit 308. A quartz crystal 372 is connected across the crystal input of the microprocessor unit 308. A capacitor 370 is connected between ground and one side of the quartz crystal 372. The quartz crystal 372 operates as a time base for the microprocessor unit 308.

The digital processor and memory 52 also includes a power reset circuit. The power reset circuit utilizes a reset switch 374, a set of resistors 376, 378 and 380, a capacitor 382, and a pair of inverting amplifiers 384 and 386 and is operative to reset the microprocessor unit 308 after a power interruption. The output of the inverting amplifier 386 is connected to the reset input of the microprocessor unit 308.

Figure 2D:
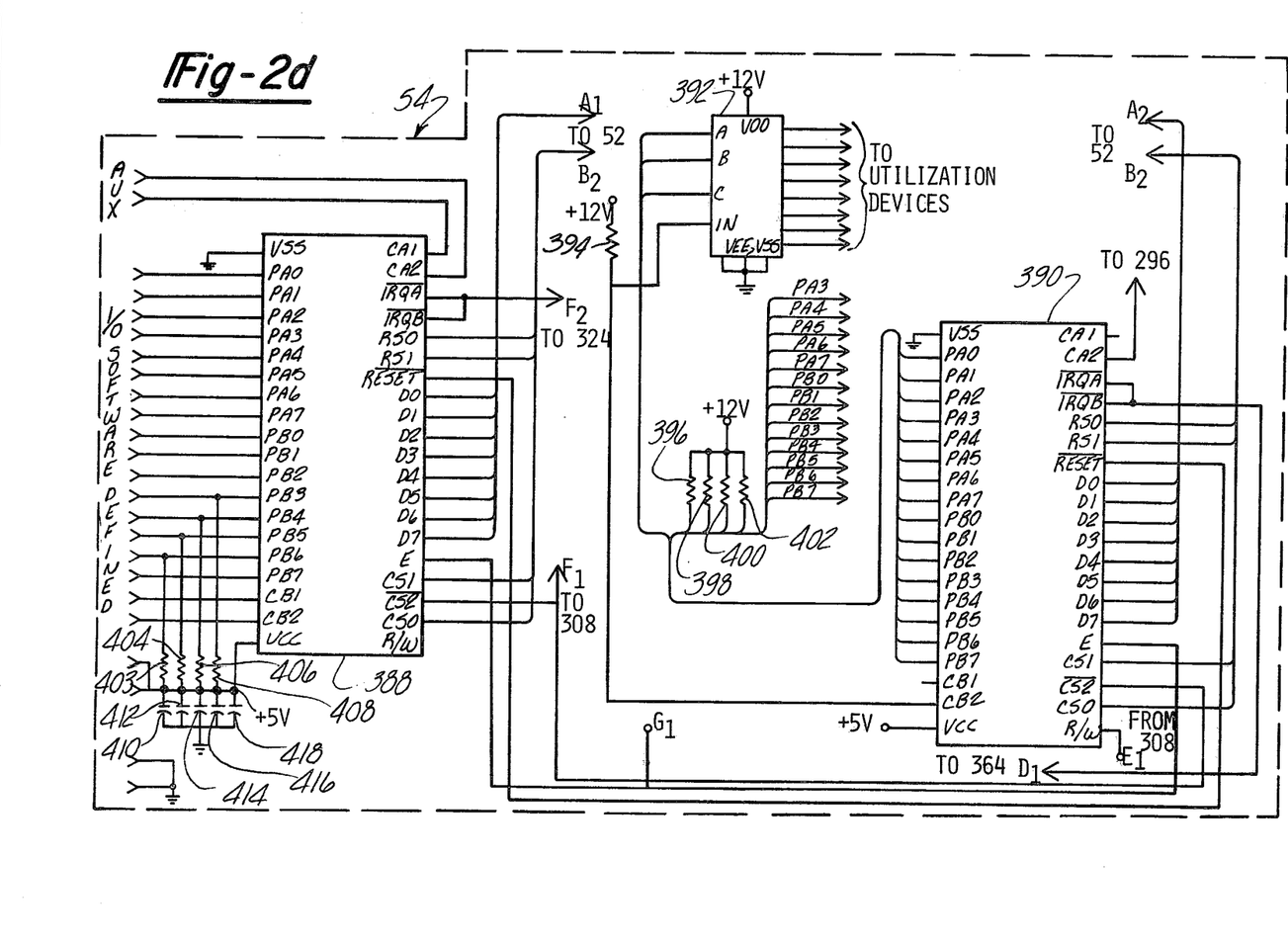

The interface 54 shown in detail in FIG. 2d utilizes a pair of integrated circuit peripheral interface adaptors 388 and 390, and an integrated circuit binary addressable demultiplexer 392. A resistor 394 is connected between a positive external power supply and the junction of an input of each of the peripheral interface adaptor 390 and the demultiplexer 392. A set of resistors 396 and 398, 400 and 402 each have one side connected in common to a positive external power supply. The other side of each of these resistors is connected to an input of the peripheral interface adaptor 390.

A set of resistors 403, 404, 406 and 408, and a set of capacitors 410, 412, 414, 416, and 418 each have one side connected to a common junction. The other sides of each of these capacitors are connected to ground and the other sides of each of the resistors are connected to separate inputs of the peripheral interface adaptor 388.

In operation the integrated circuit 102 of FIG. 2a generates an electrical oscillating signal having a fundamental frequency of 5 kilohertz. The frequency of the signal may be changed by adjusting the potentiometer 114. The output of the integrated circuit 102 is filtered to remove the harmonic components of the electrical oscillating signal, and is then amplified and inverted by the amplifier 128. The potentiometer 126 adjusts the shape of the signal waveform by varying the filtering action.

The Darlington transistor circuits 130 and 138 operate as a complementary pair to amplify the output of the amplifier 128. The output of the complementary pair is fed to the peak detector 35 to thereby control the operation of the integrated circuit 102.

Referring again to FIG. 2b, the output of the power amplifier 14 is fed to the zeroing potentiometers 160, 162, 164, 166, 168, 170, 172 and 174 and to the variable displacement inductive probes 16, 18, 20, 22, 24, 26, 28 and 30. One or more of the probes are typically used to measure the dimensions of a work piece. In the preferred embodiment of the invention one or more of the probes are in direct contact with particular points on a workpiece. However, non-contact sensing probes or transducers may be used without departing from the invention. Each of the probes operates to modulate the five kilohertz carrier frequency in proportion to the displacement of the inductive element within each probe. The mutually exclusive analog switch 38 is successively triggered by the digital processor and memory 52 via lines forming part of a multiconductor bus 211 to sequentially connect each of the variable displacement inductive probes to the positive input of the differential amplifier 190.

In order to compensate for the variances of each inductive probe the mutually exclusive analog switch 158 simultaneously selects from one of the zeroing potentiometers 160, 162, 164, 166, 168, 170, 172 and 174, each potentiometer corresponding to a particular inductive probe, and connects the zeroing signal produced by a particular potentiometer to the negative input of the differential amplifier 190. The bridge completion network 32 operates in conjunction with each zeroing potentiometer to provide a voltage which will zero the zero displacement signal of each of the inductive probes. The mutually exclusive analog switch 158 is triggered in synchronism with the analog switch 38 by the digital processor and memory 52 to thereby connect the proper zeroing potentiometer.

The differential amplifier 190 operates to amplify the difference between the signal generated by the zeroing potentiometers and bridge completion network 32 and the signal generated by the variable displacement inductive probes. The mutually exclusive analog switch 194 is triggered by the digital processor and memory 52 via lines forming part of the multiconductor bus 211 to thereby select a suitable resistor in order to control the gain of the amplifier 190. The output of the amplifier 190 is inverted by the buffer amplifier 192 and is fed through a coupling capacitor 226 to the input of a balanced network within the demodulator 46.

In order to provide synchronous detection of the modulated signal produced by the variable displacement inductive probes, it is necessary to generate an injection signal having the same frequency and phase as the carrier of the signal which is to be detected. The phase shifter 36, generates this injection signal by shifting the phase of the excitation signal from the output of the power amplifier 14.

The phase shifter 36 utilizes a differential amplifier 163 in a variable feedback type of arrangement to shift the phase of the excitation signal from the power amplifier 14. This insures that the phase of the injection signal is the same as that of the signal of the output of the amplifier 192. The potentiometer 180 is adjusted to provide the desired degree of phase shift.

The amplifier 182 then amplifies the injection signal and drives both the inverting amplifier 184 and the input of the CMOS switch 186. The output of the inverting amplifier 184 drives the input of the CMOS switch 188.

The CMOS switches 186 and 188 act as a chopper to thereby operate in conjunction with the demodulator 46 to provide synchronous detection of the modulated carrier signal. Since the demodulated signal is an analog d.c. signal, the differential amplifier 243 produces an amplified d.c. signal at its output. The potentiometer 256 is used to balance the offset level of the output of the differential amplifier 243.

In order to permit digital processing of the information provided by each of the variable displacement inductive probes, an analog to digital convertor 50 of FIG. 2c converts the analog d.c. signal from the output of the demodulator 46 into an 8 bit digital number. The inverting amplifier 286 generates an oscillating electrical signal which is fed to the clock input of the analog to digital convertor integrated circuit 296. Six of the eight outputs of the integrated circuit 296 are fed to a tri-state buffer 302. The output of the buffer is fed to the microprocessor unit 308 which operates to store the output in a location in memory controlled by the stored program.

During the operation of the preferred embodiment of the invention, the number of variable displacement inductive probes which are used and their specific functions are programmed into the erasable programmable read only memory 310. Changes in the specific application of the multiple probe gage system may be made simply by plugging in a different erasable programmable read only memory.

The use of digital signal processing under program control allows the multiple probe gage circuit to automatically correct for any drift. For example one method of zeroing each of the variable displacement inductive probes is to place a master workpiece into a gaging fixture and manually zero each probe with the zeroing potentiometers 160, 162, 164, 166, 168, 170, 172 and 174 of FIG. 2b. With the multiple probe gage system, however, the master workpiece is placed in the gaging fixture and all the probes are read and stored sequentially. Since each probe reading is stored in a different location, these stored readings can be subtracted digitally from the readings obtained during the gaging operation by action of the microprocessor 110, thereby correcting for any deviation from the true zero due to drift. The subtractions are controlled by a program for the microprocessor stored at an appropriate location within the memory. These zero corrections are retained in memory until the master workpiece is again used to check for drift. In the event of a power failure, a battery backup power network connected to the VCC standby input of the microprocessor unit 308 provides memory retention for several days.

The microprocessor 308 may be programmed to perform other operations upon probe signals stored within its memory, such as determining the difference between probe signals or calculating the distance between points on the workpiece as a function of probe signals.

In order to utilize the information provided at the output of the microprocessor unit 308 the interface 54 of FIG. 2d employs the peripheral interface adaptors 388 and 390. The output of the adaptor 390 is connected to a binary addressable demultiplexer 392. The output of the demultiplexer 392 is used to enable a column gage display. The adaptor 388 provides auxiliary support and can be used for such functions as limit output, sorter control outputs and various control inputs.

In the event of a power failure the reset switch 374 of FIG. 2c must be actuated in order to reset the microprocessor unit 308. When the reset switch 374 is actuated, a pluse changes the state of each of the inverting amplifiers 384 and 386. The output of the inverting amplifier 386 triggers the reset input of the microprocessor unit 308.

While provisions for 8 probes are shown in the preferred embodiment of the invention, the system is very easily expandable to any number of probes.

The following component values have been found satisfactory for an operative embodiment of the invention. All integrated circuits are available from various suppliers including Motorola, Inc.

| Reference Number | COMPONENTS Type | Value or Number |
|---|---|---|
| 38 | Integrated circuit | CD 4051 |
| 42 | resistor | 1K ohm |
| 44 | resistor | 50K ohms |
| 102 | integrated circuit | XR 2206 |
| 104 | resistor | 180 ohms |
| 106 | resistor | 100K ohms |
| 108 | resistor | 11K ohms |
| 110 | capacitor | .015 mf |
| 112 | capacitor | 1.0 mf |
| 114 | potentiometer | 5K ohms |
| 115 | resistor | 3.24K ohms |
| 116 | resistor | 220 ohms |
| 118 | resistor | 6.49K ohms |
| 120 | resistor | 6.49K ohms |
| 122 | capacitor | .015 mf |
| 124 | capacitor | .015 mf |
| 126 | potentiometer | 1K ohms |
| 128, 168 | integrated circuit | 4558 |
| 130 | darlington transistors | MPS-U45 |
| 132 | diode | IN914 |
| 134 | diode | IN914 |
| 136 | diode | IN914 |
| 138 | darlington transistors | MPS-U95 |
| 140 | resistor | 10K ohms |
| 142 | resistor | 2.2 ohms 0.5 watt |
| 144 | resistor | 2.2 ohms 0.5 watt |
| 146 | resistor | 10 ohms |
| 148 | capacitor | 10 mf |
| 150 | capacitor | 10 mf |
| 152 | capacitor | 0.1 mf |
| 154 | resistor | 511 ohms |
| 156 | resistor | 511 ohms |
| 158 | integrated circuit | CD 4051 |
| 160 | potentiometer | 20K ohms |
| 161 | potentiometer | 20K ohms |
| 162 | potentiometer | 20K ohms |
| 163 | potentiometer | 20K ohms |
| 164 | potentiometer | 20K ohms |
| 165 | potentiometer | 20K ohms |
| 166 | potentiometer | 20K ohms |
| 167 | potentiometer | 20K ohms |
| 169 | resistor | 3.16K ohms |
| 170 | resistor | 3.16K ohms |
| 171 | resistor | 3.16K ohms |
| 172 | resistor | 4.70K ohms |
| 173 | capacitor | 0.01 mf |
| 174 | capacitor | 0.01 mf |
| 176 | capacitor | 0.01 mf |
| 178 | capacitor | 0.1 mf |
| 180 | potentiometer | 100K ohms |
| 182, 184 | integrated circuit | TL 082 |
| 186, 188 | integrated circuit | 4066 |
| 190 | integrated circuit | 3660 |

-continued

COMPONENTS

| Reference Number | Type | Value or Number |
|---|---|---|
| 192 | integrated circuit | TL 082 |
| 194 | integrated circuit | CD 4051 |
| 196 | resistor | 49.9K ohms |
| 198 | resistor | 49.9K ohms |
| 200 | potentiometer | 1 MEG ohms |
| 202 | resistor | 20.0K ohms |
| 204 | resistor | 10.0K ohms |
| 206 | resistor | 4.00K ohms |
| 208 | resistor | 2.00K ohms |
| 210 | resistor | 25.0K ohms |
| 212 | resistor | 10.2K ohms |
| 214 | resistor | 5.10K ohms |
| 216 | resistor | 2.50K ohms |
| 218 | capacitor | 0.001 mf |
| 220 | resistor | 5K ohms |
| 222 | resistor | 25K ohms |
| 224 | resistor | 5K ohms |
| 226 | capacitor | 0.1 mf |
| 228 | resistor | 2.5K ohms |
| 320 | resistor | 20K ohms |
| 232 | resistor | 25K ohms |
| 234 | resistor | 2.5K ohms |
| 336 | resistor | 20K ohms |
| 238 | resistor | 25K ohms |
| 240 | capacitor | 0.1 mf |
| 242 | capacitor | 0.1 mf |
| 243 | integrated circuit | LM 308 |
| 244 | resistor | 100K ohms |
| 246 | capacitor | 0.001 mf |
| 248 | capacitor | 100 pf |
| 250 | resistor | 100K ohms |
| 252 | resistor | 1K ohms |
| 256 | resistor | 100K ohms |
| 258 | integrated circuit | LM 301 |
| 260 | resistor | 4.7K ohms |
| 262 | resistor | 4.7K ohms |
| 264 | diode | IN914 |
| 266 | capacitor | 10 mf |
| 268 | resistor | 10K ohms |
| 270 | integrated circuit | LM 308 |
| 272 | resistor | 10K ohms |
| 274 | resistor | 10K ohms |
| 276 | resistor | 10K ohms |
| 278 | capacitor | 0.22 mf |
| 280 | potentiometer | 50K ohms |
| 282 | resistor | 10K ohms |
| 284 | diode | IN914 |
| 286 | integrated circuit | 4584 |
| 290 | resistor | 100K ohms |
| 292 | resistor | 10K ohms |
| 294 | capacitor | 120 pf |
| 296 | integrated circuit | MM 5357 |
| 298 | diode | IN914 |
| 300 | integrated circuit | 4584 |
| 302 | integrated circuit | 4503 |
| 304 | resistor | 10K ohms |
| 306 | resistor | 10K ohms |
| 308 | integrated circuit | MC6802 |
| 310 | integrated circuit | 2708 |
| 312 | integrated circuit | 4503 |
| 314 | integrated circuit | 4503 |
| 316 | integrated circuit | 74LS138 |
| 318 | integrated circuit | 74LS00 |
| 320 | integrated circuit | 74LS00 |
| 322 | integrated circuit | 74LS00 |
| 324 | integrated circuit | 74LS00 |
| 326 | integrated circuit | 74LS00 |
| 328 | integrated circuit | 74LS00 |
| 330 | integrated circuit | 74LS00 |
| 332 | thumb wheel switch | 6020 |
| 333 | resistor | 10K ohms |
| 334 | resistor | 10K ohms |
| 336 | resistor | 10K ohms |
| 338 | resistor | 10K ohms |
| 340 | resistor | 10K ohms |
| 342 | resistor | 10K ohms |
| 344 | thumb wheel switch | 6020 |
| 346 | resistor | 10K ohms |
| 348 | resistor | 10K ohms |
| 350 | single pole, quadruple switch | 6040 |
| 352 | resistor | 10K ohms |
| 354 | resistor | 10K ohms |
| 356 | resistor | 10K ohms |
| 358 | resistor | 10K ohms |
| 360 | resistor | 4.7K ohms |
| 362 | resistor | 4.7K ohms |
| 364 | resistor | 4.7K ohms |
| 366 | resistor | 4.7K ohms |
| 368 | capacitor | 0.1 mf |
| 370 | capacitor | 22 pf |
| 372 | quartz crystal | 3.58 mhz |
| 374 | switch | |
| 376 | resistor | 470 ohms |
| 378 | resistor | 100K ohms |
| 380 | resistor | 1K ohms |
| 382 | capacitor | 5 mf |
| 384, 386 | integrated circuit | 4584 |
| 388 | integrated circuit | MC6820 |
| 390 | integrated circuit | MC6820 |
| 392 | integrated circuit | 4051 |
| 394 | resistor | 10K ohms |
| 396 | resistor | 10K ohms |
| 398 | resistor | 10K ohms |
| 400 | resistor | 10K ohms |
| 402 | resistor | 10K ohms |
| 403 | resistor | 10K ohms |
| 404 | resistor | 10K ohms |
| 406 | resistor | 10K ohms |
| 408 | resistor | 10K ohms |
| 410 | capacitor | 0.1 mf |
| 412 | capacitor | 0.1 mf |
| 414 | capacitor | 0.1 mf |
| 416 | capacitor | 0.1 mf |
| 418 | capacitor | 0.1 mf |
| 420 | capacitor | 15 mf |

The invention has been described with reference to a specific embodiment and specific component values and it is to be understood that although this embodiment represents the best mode in practicing the invention known to the inventor at the time of filing the patent application, various modifications and additions to the illustrated embodiment are possible and accordingly the foregoing description is not to be construed in a limited sense.

The embodiments of the invention in which an exclusive property or privilege is claimed are defined as follows:

1. A multiple probe gaging system for producing output signals related to the dimensions of a workpiece comprising:

sensing means including a plurality of probe transducers for contacting a workpiece, each operative to generate an analog electrical signal as a function of the position of said workpiece relative to each said transducer;

convertor means having an input and an output, operative to transform analog electrical signals presented to said input into digital signals at said output;

switch means coupled between said sensing means and said convertor means input;

digital computing means and memory means coupled between said convertor means output and a control input of said switch means, operative to automatically actuate said switch means to selectively couple the analog electrical signal of particular probes to said convertor means input in accordance with a stored program in said memory, said digital computing means being further operative to store said digital signals generated at said convertor means output at predetermined locations in said memory means and to process said digital signals to produce system output signals which are a function of a plurality of said digital signals stored at said predetermined locations in accordance with said program in the memory, wherein said system operation may be adapted to gage various types of workpieces by changing the program in the memory.

2. The system of claim 1 wherein said sensing means further comprises:

oscillator means coupled to each of said transducers, operative to provide an electrical excitation signal thereto.

3. The system of claim 2 which further comprises:

peak detection means coupled between an input and an output of said oscillator means operative to limit the peak value of said electrical excitation signal.

4. A multiple probe gaging system for producing output signals related to the dimensions of a workpiece comprising:

an electronic oscillator operative to provide a carrier frequency signal;

sensing means coupled to said oscillator, said sensing means including at least two transducers, each operative to modulate said carrier frequency signal as a function of the position of said workpiece relative to each said transducer;

demodulator means having an input and an output, operative to demodulate a modulated transducer signal presented to said input to provide a direct current signal at said output;

switch means operative to selectively couple the transducers of said sensing means to said demodulator input;

convertor means coupled to said demodulator output and operative to transform said signals at said demodulator output into digital electrical signals; and digital computing means including associated memory means, said digital computing means coupled to and operative to actuate said switch means to automatically select particular transducers according to a program stored in said memory means, and further operative to store said digital electrical signals at predetermined locations in said memory means and to process said digital electrical signals to produce system output signals which are a function of a plurality of said digital electrical signals in accordance with said program in the memory, wherein said system operation may be adapted to gage a variety of nonuniform workpieces by changing the program in the memory.

5. The system of claim 4 wherein said demodulator further comprises:

a synchronous detector operative to detect the modulation components of said carrier frequency signal modulated according to the position of said workpiece relative to said transducers.

6. The system of claim 5 which further includes a power amplifier having an input coupled to an output of said oscillator and wherein said synchronous detector comprises:

phase shifter means coupled to an output of said power amplifier, operative to generate an injection signal having the same frequency and phase as said carrier signal; and chopper means having an input coupled to said phase shifter means and an output coupled to said demodulator to provide synchronous detection of the portions of the modulated carrier frequency signal representative of the position of the workpiece relative to the transducers.

7. The system of claim 4 which further comprises:

peak detection means coupled between an input and an output of said oscillator operative to limit the peak value of said carrier frequency signal.

8. The system of claim 4 further comprising:

means for generating reference signals from said transducers as a function of the position of a reference workpiece relative to each said transducer; and means in said digital computing means for storing converted digital signals corresponding to said reference signals at predetermined dedicated locations in said memory, whereby said converted digital signals may be processed with digital electrical signals generated by said convertor means in subsequent gaging operations of said system.

9. The system of claim 4 further comprising:

a differential amplifier coupled between said switch means and said demodulator; and variable gain selection means coupled to said differential amplifier and to said digital computing means, operative to determine the gain of said differential amplifier as a function of control signals received from said digital computing means.

10. The system of claim 9 which further comprises:

zeroing network means having a plurality of potentiometers, one for each transducer, operative to generate a zeroing signal for its corresponding transducer; and second switch means having a plurality of inputs coupled to said zeroing potentiometers and an output coupled to said differential amplifier, with said digital computing means providing a control signal to said second switch means for connecting the appropriate zeroing potentiometer to said differential amplifier in synchronism with its corresponding transducer output signal.

* * * * *